United States Patent [19]

Fujiwara

[11] Patent Number: 4,778,235

[45] Date of Patent: Oct. 18, 1988

[54] OPTICAL SWITCH

[75] Inventor: Masahiko Fujiwara, Tokyo, Japan

[73] Assignee: NEC Corporation, Tokyo, Japan

[21] Appl. No.: 683,100

[22] Filed: Dec. 18, 1984

[30] Foreign Application Priority Data

Dec. 21, 1983 [JP] Japan ............................. 58-241264

[51] Int. Cl.$^4$ .............................................. G02B 6/10
[52] U.S. Cl. ............................. 350/96.13; 350/96.14;
372/44; 357/30
[58] Field of Search .......................... 350/96.13, 96.14;
372/44, 46, 47, 50; 357/30, 30 E

[56] References Cited

U.S. PATENT DOCUMENTS 4,190,809 2/1986 Goodman et al. .................... 372/46
4,546,479 10/1985 Ishikawa et al. ..................... 372/46

OTHER PUBLICATIONS

M. Papuchon; Electrically Switched Optical Direction Coupler: Cobra; 9/1975; pp. 289-291.
Chen S. Tsai; Optical Channel Waveguide Switch and Coupler Using Total Internal Reflection; 1978; pp. 513-517.
Hiroo Yonezu; A GaAs-Al Ga$_1$-As Double Heterostructure Planar Strip Laser; 10/73; pp. 1585-1592.
Y. Ide; Transverse Mode Stablized AlGaAs/GaAs Plano-Convex Waveguide Laser Made by a Single-Step Liquid Phase Epitaxy; 1/1980; pp. 121-123.
R. Alferness; Fast Compact Optical Waveguide Switch Modulator; 2/1981; pp. 214-217.
A. Carenco; InP Electro-Optical Directional Coupler; 4/1982; pp. 653-655.
Y. Suematsu; Oscillation-Modes and Mode-Control in Semiconductor Laser with Stripe-Geometry; pp. 434-440.

Primary Examiner—William L. Sikes
Assistant Examiner—Robert E. Wise
Attorney, Agent, or Firm—Sughrue, Mion, Zinn, Macpeak and Seas

[57] ABSTRACT

An optical switch having a plurality of channel waveguides. At least one of which is a gain-guided channel waveguide. In operation, a light beam incident on one end face of the optical switch through one of the channel waveguides exits from the switch through one or another of the channel waveguides in accordance with current injected into the gain-guided channel waveguide. As a result, a compact low-voltage optical switch is possible. The channel waveguides may run parallel to each other, or may come together in a center portion in a X-shape, separated by a relatively small distance, or as a third alternative may be formed in a Y-shape, with a small distance separating the branches of said Y-shape.

8 Claims, 2 Drawing Sheets (a)

OPTICAL SWITCH

BACKGROUND OF THE INVENTION

The present invention relates to an optical switch, and more particularly to an optical switch for switching optical signals as they are.

As optical communication systems have come into regular practical use in recent years, systems for providing entirely new functions and services have come to be conceived. Devices needed for such systems include an optical switch for switching the connections of many optical transmission channels at high speed.

As optical switches for this purpose, waveguide type switches utilizing the electrooptical effects of ferroelectrics such as LiNbO$_3$ or of semiconductor materials such as GaAs and InP are extensively studied. For the structures of such switches are proposed a directional coupler type, as described in an article by M. Papuchon et al. in Applied Physics Letters, Vol. 27, 1975, pp. 289–291, and a crossover waveguide-based type like what is described in an article by Chen S. Tsai et al. in the IEEE Journal of Quantum Electronics, Vol. QE-14, 1978, pp. 513–517.

However, these optical switches involve the problem that, even where a dielectric substance having a relatively large electrooptical coefficient, such as LiNbO$_3$, is used, the refraction index variation provided by the electric field is small and a high voltage is required for switching. To reduce the required switching voltage, the coupling length has to be extended for the directional coupler type, or the crossover angle narrowed for the crossover waveguide type, so that the switching voltage reduction and the switch size reduction tend to be mutually contradictory requirements. Therefore, it has been difficult to obtain a compact low-voltage optical switch of either type and to structure a multi-channel switch matrix by integrating many optical switches on a single substrate.

SUMMARY OF THE INVENTION

An object of the invention is to obviate the foregoing disadvantage and to provide a compact optical switch that can be driven at a low voltage.

According to the invention, there is provided an optical switch for achieving optical switching between a plurality of channel waveguides constituting a directional coupler, a cross-over, branches and the like, wherein at least one of said plurality of channel waveguides is a gain-guided type waveguide utilizing a gain difference resulting from carrier injection into a semiconductor material.

BRIEF DESCRIPTION OF THE DRAWINGS

FIGS. 5a, 5b and 5c illustrate a third preferred embodiment of the invention, FIG. 5a showing a plan view without the electrodes of the optical switch, FIG. 5b, a plan view of an end face of the optical switch and FIG. 5c, the BB' section of FIG. 5a.

DETAILED DESCRIPTION OF THE PREFERRED EMBODIMENTS

Before describing the preferred embodiments of the present invention, its principle will be explained to facilitate its understanding.

Generally in an optical waveguide of the planar type, the electric field intensity distribution E(X) of light in one direction (supposed to be the X direction here) of light confinement is determined by the following wave equation using the complex dielectric constant distribution $\epsilon(X)$ in this direction:

$$\left\{ \frac{d^2}{dx^2} + k^2 \epsilon(X) \right\} E(X) = \beta^2 E(X)$$

where $k = 2\pi/\lambda$ is the number of waves and $\beta$, the propagation constant of light in its propagating direction. $\epsilon(X)$ can be represented by $$\epsilon(X) = \{n(X) + jG(X)2k\}2$$

where n(X) is the refractive index and G(X), the local gain.

Many studies have been made on such optical waveguides having distributions both in refractive index and gain with respect to the stabilization of semiconductor lasers in their horizontal transverse mode. For instance, in an article by Suematsu and Yamada entitled "Oscillation-Modes and Mode-Control in Semiconductor Lasers with Stripe-Geometry" (in Japanese), TRANSACTION ON IECE Japan (Section J), Vol. 57-C, No. 11, pp. 434–440 (1974), the optical waveguide having the refractive index n(X) and the local gain G(X) rectangularly distributed is discussed in detail. Their findings and those of other researchers have demonstrated that, not only where there is no difference in refractive index n between the wave guiding layer of the waveguide and the cladding layers over and underneath the wave guiding layer but even where the wave-guiding layer has a lower refractive index than the cladding layers, there is a range in which a stable wave guiding mode is present if the wave guiding layer has a higher local gain than the cladding layers. This means that, if a gain is given to a planar type active waveguide made of a semiconductor material (more specifically, a semiconductor layer having a planar type double heterostructure, for instance) by current injection or otherwise, that part can be made a channel waveguide.

Figure 1:
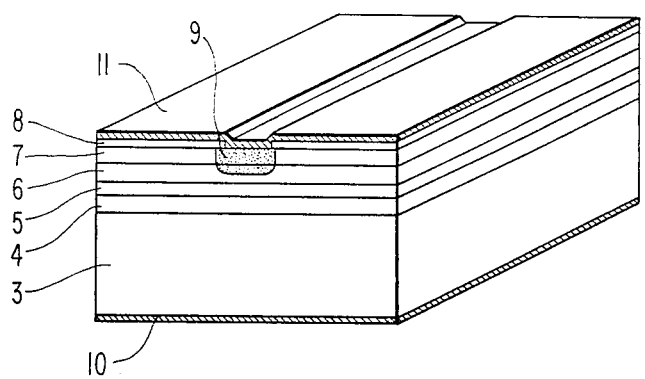
FIG. 1 shows an oblique view of a planar stripe semiconductor laser to be used for explaining the principle of the present invention.

This aspect will be explained below in greater detail with reference to drawings. FIG. 1 illustrates a conventional planar striped type semiconductor laser, used for describing a wave guiding action resulting from a difference in gain. (For further detail on such a laser, reference may be made to an article by H. Yonezu et al. in the Japanese Journal of Applied Physics, Vol. 12, 1973, pp. 1585–1592, where a laser made of an AlGaAs-based material is described.) The semiconductor laser includes over an n-InP substrate 3, with an n-InP buffer layer 4 in-between, a non-doped InGaAsP active layer 5, a p-InP cladding layer 6 and an n-InGaAsP capping layer 7. On the side of these epitaxial layers is formed, with an SiO$_2$ mask 8 in-between, a p region 9 by the selective diffusion of Zn, Cd and so forth until it reaches the p-InP cladding layer 6. Ohmic electrodes 10 and 11 are formed, respectively on the substrate side and on the epitaxial layer side, the former being made of Au-Ge-Ni metals and the latter of Au-Zn or Ti-Pt-Au metals.

Since the InGaAsP active layer 5 has a higher refractive index than those of the InP layers above and below, there is forme in the layer thickness direction a greatly refractive index-guided type waveguide. In the direction parallel to the layers, on the other hand, there is no particular distribution of refractive index. If this element here is biased in the forward direction and a current is injected into it, the current will be selectively injected from the p region 9 into the active layer 5.

Figure 2:
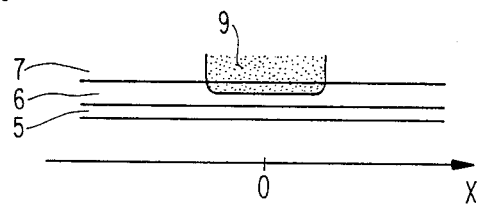
FIG. 2 is also to be used for explaining the principle of the invention, wherein (a) is a rough cross section of the area near an active layer, (b) shows a carrier density distribution, (c), a gain distribution and (d), a refractive index distribution.
Figure 2:
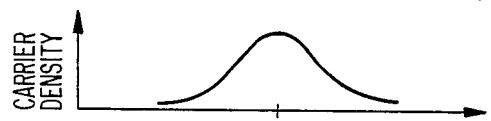
Figure 2:
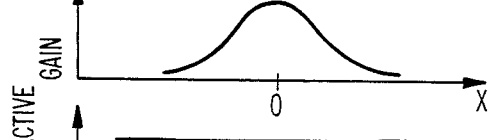
Figure 2:
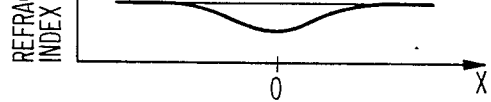

FIG. 2 shows the stratified structure near the active layer 5 in (a), and the distributions of carrier density in (b), gain in (c) and refractive index in (d) in the x direction within the active layer 5 in and above the vicinity of the threshold. The carrier density, because of diffusion in the transverse direction, decreases toward the peripheries and therefore manifests a convex distribution as illustrated in (b). As the gain is substantially proportional to the carrier density and the refractive index, on the contrary, is in inverse proportion to the carrier density, their distributions are as illustrated in FIGS. 2 (c) and (d), respectively. Thus, in the x direction, the refractive index is lower toward the middle, so that there is no wave-guiding by the refractive index alone. However, in and above the vicinity of the threshold where there are great gain differences between the middle and peripheries, there is a stable wave guiding mode. The transverse mode stabilization mechanism in a planar stripe laser is due to such a wave guiding mechanism of the gain. A similar mechanism can be expected where such a device is used not as a laser but as a waveguide for light injected from outside if the wavelength of the injected light is near the center of the gain distribution. Further, this optical wave guiding mechanism can be controlled by the presence or absence of gain, i.e. by the presence or absence of current injection, and can even be reduced to zero if no current is injected. Therefore, where such a gain-guided type waveguide is used in an optical switch, the waveguide action can be controlled far more greatly than where the refractive index of the waveguide is perturbed by an electrooptical effect. Moreover, the voltage required for current injection to form a gain-guided type waveguide is 1 or 2V at most, substantially determined by the built-in potential of the semiconductor. Therefore, by the use of a gain-guided type waveguide, there can be realized a very compact low-voltage optical switch.

Figure 3:
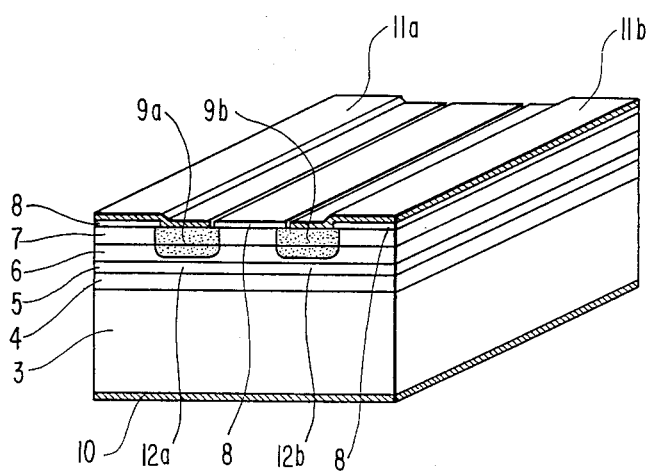
FIG. 3 shows an oblique view of a first preferred embodiment of the invention.

Referring to FIG. 3, the optical switch illustrated therein involves a wafer of normal double heterostructure formed by growing an n-InP buffer layer 4 (Te-doped, about 4 microns thick), a non-doped InGaAsP active layer 5 (0.1 to 0.2 microns thick, bandgap wavelength $\lambda_g \simeq 1.3$ microns), a p-InP cladding layer 6 (about 0.5 micron thick) and an n-InGaAsP capping layer 7 (about 1 micron thick) over an n-InP substrate 3, an SiO$_2$ mask 8 having two parallel stripes of openings close to each other, and p$^+$ regions 9a and 9b so formed by the selective diffusion of Cd or Zn through the openings of this mask as to reach the p-InP cladding layer 6. Further on the substrate side is formed an Au-Ge-Ni ohmic electrode 10, and on the opposite side are formed of Au-Zn or Ti-Pt-Au electrodes 11a and 11b, so divided as to permit independent injection of currents into the p$^+$ regions 9a and 9b. After that, input/output end faces are formed by cleavage perpendicularly to the stripe-shaped p$^+$ regions 9a and 9b and antireflection coated to finish an optical switch of the structure illustrated in FIG. 3.

In FIG. 3, if a forward bias is applied between the electrodes 11a and 11b and the electrode 10 at a level in the vicinity of the threshold, the gain distribution in the active layer 5 will cause two gain-guided channel waveguides 12a and 12b to be formed in the parts of the active layer 5 immediately below the p regions 9a and 9b, respectively, to constitute a directional coupler for the light beam with wavelengths within the gain-bandwidth of the active layer. Accordingly, the power of a light beam ($\lambda \simeq \lambda g \simeq 1.3$ microns) having entered into the channel waveguide 12a shifts, as the beam propagates, between the two channel waveguides 12a and 12b in a cycle equal to the complete coupling length.

The ratio $P_b$ of the optical power in the channel waveguide 12b to the total power of light incident on the channel waveguide 12a, the wave guiding loss being ignored for brevity's sake, is represented by the coupling mode theory as follows under approximation where the coupling is sufficiently weak:

$$P_b = \frac{1}{\left(\frac{\Delta \beta}{2K}\right)^2 + 1} \sin^2\left(\frac{\pi l}{2L_o} \sqrt{\left(\frac{\Delta \beta}{2K}\right)^2 + 1}\right)$$

wherein $\Delta \beta$ is the phase constant difference between the two channel waveguides, l is the length of the coupling part, Lo is the complete coupling length and K is the coupling coefficient, K having the following relationships with Lo and the optical waveguide interval G:

$$K \cdot L_o = \pi/2, \quad K = A \exp(-B \cdot G)$$

where A and B are constants determined by the width and refractive index distributions of the waveguide. In this embodiment, if the width of the current injection region is set at 4 microns, the waveguide interval will be about 4 microns or less, and Lo, no more than around 1 mm. The phase constant difference $\Delta \beta$ between the two waveguides can be reduced virtually to zero if the widths of the current injection regions of the two channel waveguides are equally formed and currents are similarly injected (the condition of phase matching). Accordingly, when l is an odd-number multiple of Lo, $P_b$ equals zero.

Supposing that the switch length is equal to the complete coupling length, a light beam incident on the channel waveguide 12a will be emitted from the channel waveguide 12b. If the current injection from the electrode 11b is suspended in that state, there will no longer be any gain in the part of the active layer immediately below the p region 9b, and consequently the gain-guided type channel waveguide 12b will disappear. As the channel waveguide 9a will therefore have no other waveguide coupled to it, a light beam coming incident on the channel waveguide 9a will be emitted as it is from the channel waveguide 9a. Thus, switching can be accomplished by turning on and off the current injection into the electrode 11b. The voltage variation required for this switching action, as stated above, is at most 1 or 2V. Further, the switch length, i.e. the complete coupling length, can be controlled by varying the widths of and interval between the current injection regions and the amperages of the injection currents, and be reduced to 1 mm or less. Though it is easy to form a directional coupler with so short a coupling length even with a conventional directional coupler type optical switch utilizing the electrooptical effect, it would require an extremely large electric field to release such a strongly coupled state, and accordingly there can be provided no useful switch for practical purposes. In contrast, in the structure illustrated in FIG. 3, one of the waveguides itself will disappear if the current injection into either electrode 11a or 11b is suspended, so that a coupled state of any strength can be released. Accordingly, there can be provided an extremely compact optical switch.

Unlike usual semiconductor lasers, an optical switch needs no resonator structure, but a traveling type structure suffices, and switching is possible over a wide wavelength range within the gain band of the medium. Since, even in such a case, a gain can be expected as a traveling type optical amplifier, the insertion loss of the optical switch will be extremely small.

In the embodiment illustrated in FIG. 3, both of the two channel waveguides constituting a directional coupler are gain-guided type ones into which currents are injected, but it will also be permissible to structure one of them so as to be dependent on a refractive index difference or on a mixture of refractive index and gain differences, if only it is possible to achieve phase matching between the two channel waveguides.

Figure 4:
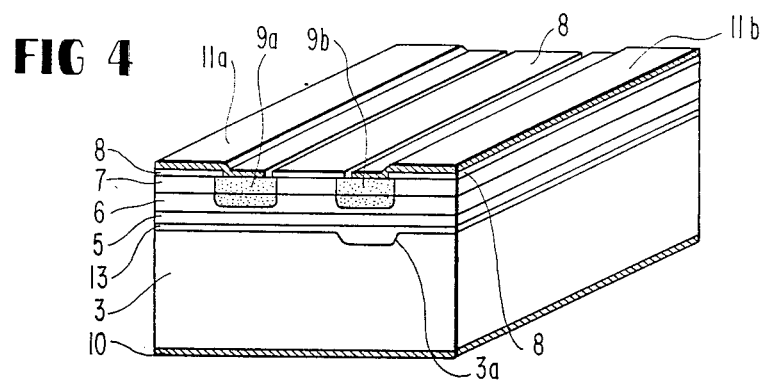
FIG. 4 shows an oblique view of a second preferred embodiment of the invention.

FIG. 4 illustrates a second preferred embodiment of the present invention, which utilizes the coupling of a waveguide dependent on a refractive index difference with another reliant on a gain difference.

Over a groove 3a formed in advance by chemical etching in the upper face of an n-InP substrate 3 are epitaxially grown an n-InGaAsP guiding layer 13 (with a bandgap wavelength of $\lambda_{g1}$), a non-doped InGaAsP active layer 5 (with a bandgap wavelength of $\lambda_{g2} \approx 1.3$ microns $> \lambda_{g1}$), a p-InP cladding layer 6 and an n-InGaAsP capping layer 7. By the selective diffusion of Cd or Zn, with a mask 8 of SiO$_2$ or the like in-between, two stripes of p$^+$ regions 9b and 9a respectively above and close to the groove 3a are formed to such an extent as to reach the p-InP cladding layer 6. Further on the back side of the substrate is formed an Au-Ge-Ni ohmic electrode 10, and on the other side are Au-Zn or Ti-Pt-Au electrodes 11a and 11b, so divided as to permit separate injection of currents into the p regions 9a and 9b. Since the guiding layer is thicker over the groove 3a in this structure, the effective refractive index is raised, and the part of the active layer 5 above the groove 3a constitutes a channel waveguide attributable to a refractive index difference. (A semiconductor laser whose horizontal transverse mode is stabilized by the use of such a waveguide structure is described in an article by Y. Ide et al. published in Applied Physics Letters, Vol. 36, 1980, pp. 121-122.) If a current is to be injected by way of the p region 9b to give a gain to the waveguide part, this waveguide structure will become dependent not only on a refractive index difference but also on a gain difference, but if the current injection region can be made sufficiently wider than the groove 3a, the carrier injection into the waveguide can be uniformized, so that the waveguide can be virtually regarded as reliant on a refractive index difference alone.

Meanwhile, if a current is injected via the p region 9a, there will be formed a gain difference-dependent waveguide as described earlier. Therefore, if these two waveguides are so formed as to match each other in phase, it will be possible to make one of the waveguides appear and disappear by turning on and off the current injection into the p region 9a, resulting in exactly the same switching action as what was described above. Further by making the other waveguide reliant on a refractive index in such a structure, the freedom of design can be increased.

While the thickness of the guiding layer 13 is varied herein to form a waveguide dependent on a refractive index difference, various other structures (including a buried structure) utilized for the transverse mode control of semiconductor lasers can as well be used for the same purpose. The same can be said of a current-confinement structure wherein the current flow is localized. Further, if one of the wave-guides, which is reliant on a refractive index difference, is formed of InGaAsP of a composition having a sufficiently wider bandgap energy than the energy of the guided light, the absorption loss can be reduced, so that there will be the advantage that current injection to give a gain can be dispensed with.

Figure 5A:
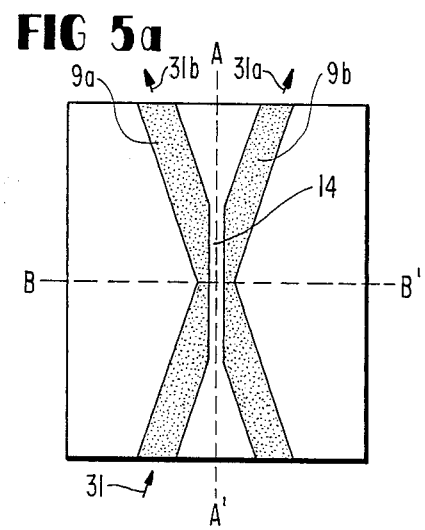
Figure 5B:
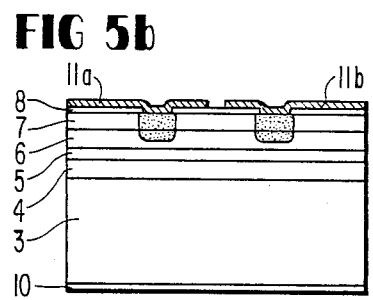
Figure 5C:
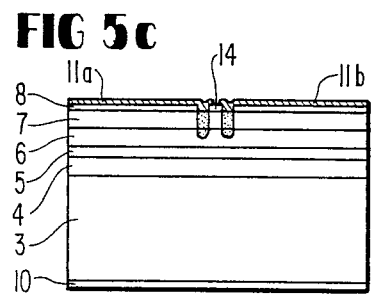

FIGS. 5a, 5b and 5c illustrate an embodiment of the application of the present invention to a cross-over waveguide type optical switch. FIG. 5a shows a plan view of the optical switch deprived of its electrodes; FIG. 5b, a plan view from an end face, and FIG. 5c, the B-B' section of FIG. 5a, with the electrodes added.

First will be described a method to produce such an optical switch by the use of InGaAsP/InP-based materials for example. There is formed a double-heterostructured wafer by growing over an n-InP substrate 3 an n-InGaAsP buffer layer 4, a non-doped InGaAsP active layer 5, a p-InGaAsP cladding layer 6 and an n-InGaAsP capping layer 7. Over this double-heterostructured wafer is formed an SiO$_2$ mask 8 covering the whole region except the hatched area in FIG. 5a, and Zn or Cd is diffused from the hatched area to reach the InGaAsP cladding layer 6 to form p-diffused regions 9a and 9b. After that, p-electrodes of Au-Zn or Ti-Pt-Au divided along the A-A' line are formed so that currents can be separately injected into the two p-diffused regions 9a and 9b, and on the substrate side is formed an electrode 10 of Au-Ge-Ni, for instance. Then, cleaving is so achieved with a plane normal to the A-A' line as to position the cross-over section in the middle to form end faces and thereby to complete a switch.

Next will be described the action of this switch. The parts of the active layer 5 into which currents are injected function as channel waveguides. Therefore, if currents are simultaneously injected into electrodes 11a and 11b, there will be formed in the active layer 5 two waveguides crossing each other. Accordingly, a light beam 31 coming incident from the end face on one of the waveguides will travel straight on, and be taken out as an emitted light beam 31a. Then, if the current injection into the p-electrode 11b is suspended, the corresponding part of the waveguide will disappear, and there will emerge a wide difference in gain level in the middle of the cross-over section along the line A-A'. As a result, the incident light beam 31 will be totally reflected and taken out as an emitted light beam 31b. Thus, switching can be achieved by turning on and off the current injection into one of the p-electrodes. The voltage variation needed for turning on and off the current injection, determined by the built-in potential of the semiconductor, is very small, at most around 2V. Moreover, a switch using crossover waveguides retains its advantages that it is generally smaller than a directional coupler type switch. Accordingly there can be provided a very compact low-voltage switch.

In the structure of this embodiment, if the area 14 where no p region is formed in the middle of the crossover section is too wide, the part where no waveguide is formed will become so wide as to adversely affect switching and loss, or if it is too narrow, it will become impossible to separately inject currents. Therefore, it is desirable not only to achieve selective diffusion but also to use inactivation of the area 14 by proton-shooting or slit formation therein by dry etching.

Figure 6A:
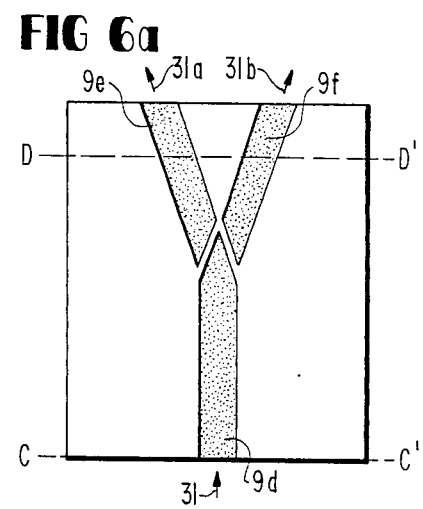
FIGS. 6a, 6b and 6c illustrate a fourth preferred embodiment of the invention, FIG. 6a showing a plan view without the electrodes of the optical switch, and FIGS. 6b and 6c, the C-C' and D-D' sections, respectively.
Figure 6B:
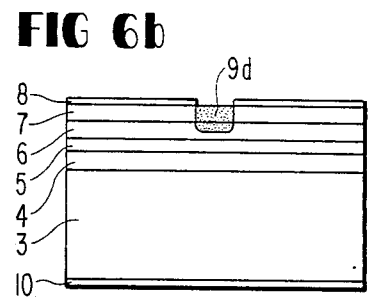
Figure 6C:
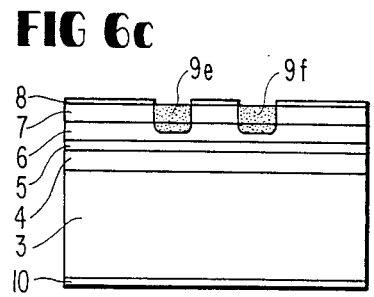

FIGS. 6a, 6b and 6c illustrate an optical switch, which embodies the application of the present invention to a Y-branched waveguide. A double-heterostructured wafer is formed by growing over an n-InP substrate 3 an n-InP buffer layer 4, a non-doped InGaAsP active layer 5, a p-InP cladding layer 6 and an n-InGaAsP capping layer 7. By diffusing Cd over the whole upper face of this epitaxially grown wafer, with an SiO$_2$ mask in-between, except the hatched region in FIG. 6a and forming three diffused regions 9d, 9e and 9f separated from one another, there will be formed a Y-branched pattern as a whole. After that, divided p-electrodes are formed in the p-diffused regions to make possible separate current injection, and an n-electrode is formed all over the substrate side. The action of this switch is substantially similar to that of the earlier described embodiment. If currents are injected into all the p-diffused regions, there will be formed a gain-guided Y-branched waveguide in the active layer 5, so that a light beam 31 coming incident on the unbranched side of the waveguide will be branched and outputted as 31a and 31b. If the current injection into the p-diffused region 9f is suspended here, there will be no wave guiding any longer, so that the output light beam 31b will disappear. Similarly, if the current injection into the p-diffused region 9e is suspended, the output light beam 31a will disappear, so that switching can be achieved. Thus there can also be provided a compact low-voltage switch like the ones described above.

Although all the waveguides used for switching are gain-guided ones in the third and fourth embodiments of the invention, it may be evident from what was stated with respect to the second embodiment that some of them may be passive ones dependent on a refractive index difference. Apparently, nor are the materials that can be used limited to the InGaAsP/InP-based ones. Further, although directional couplers having two waveguides each and Y-branches were cited as examples of optical switch of a directional coupler or branched structure, the present invention can also be applied to an optical switch having a directional coupler structure with three or more waveguides or one having three or more branches.

As hitherto described in detail, the present invention makes it possible to provide a compact optical switch that can be driven with a low voltage and which readily lends itself to integration, and therefore can make important contributions to the realization of various optical integrated circuits and optical systems including multi-channel matrix switches.

What is claimed is:

1. An optical switch for switching the path of an incident light beam comprising:
   a double heterostructure having a semiconductor active layer,
   a first semiconductor layer of a first conductive type on one side of said semiconductor active layer, and
   a second semiconductor layer of a second conductive type on the other side of said semiconductor active layer, said first and second semiconductor layers having a greater bandgap than said semiconductor active layer; and
   means for independently injecting currents into a plurality of separated local regions of said semiconductor active layer so as to cross said double heterostructure, wherein
   gain regions are formed in said local regions by current injection, at least two of said gain regions are close enough to each other to enable optical coupling between them, and said gain regions are gain-guided optical waveguides induced by a gain difference resulting from carrier injection into said semiconductor active layer, wherein the path of the incident light beam is switched by creating or extinguishing some of the gain-guided regions by controlling said current injection into corresponding ones of said gain-guided optical waveguides.

2. An optical switch for switching the path of an incident light beam, said optical switch comprising:
   a semiconductor substrate;
   a first electrode formed below said semiconductor substrate;
   a plurality of semiconductor layers formed on top of said semiconductor substrate;
   a plurality of channel waveguides formed in said plurality of semiconductor layers, at least one of said channel waveguides being a gain-guided channel waveguide; and
   a second electrode formed over said plurality of semiconductor layers, said second electrode being divided into a plurality of portions, each of said portions being contacted with a corresponding one of said channel waveguides; wherein
   when a light beam becomes incident on one of said at least one gain-guided channel waveguides the light beam exits said switch from one or another of said channel waveguides in accordance with a magnitude of current injected to a portion of said second electrode contacting said at least one gain-guided channel waveguide.

3. An optical switch as claimed in claim 2, wherein all of said channel waveguides are gain-guided channel waveguides, wherein, when a light beam is incident on one of said gain-guided channel waveguides, the beam exits from one or another of said gain-guided channel waveguides in accordance with a magnitude of current injected into corresponding portions of said second electrode.

4. An optical switch as claimed in claim 2, wherein said plurality of channel waveguides comprise two channel waveguides, one of said channel waveguides being a gain-guided channel waveguide and the other of said channel waveguides being a waveguide dependent on a difference in refractive index along a direction perpendicular to a direction of incidence of a light beam, wherein when said other of said channel waveguides is biased in a forward direction, and current is injected into a portion of said second electrode contacting said other of said channel waveguides, a light beam incident into one of the channel waveguides will exit from the other of said channel waveguides in accordance with the degree of current injection.

5. An optical switch as claimed in claim 2, wherein said channel waveguides are parallel to each other and are perpendicular to respective end faces of said switch.

6. An optical switch as claimed in claim 2, wherein said channel waveguides are separated by a first distance at respective end faces of said optical switch, and are separated by a second, smaller distance within said optical switch.

7. An optical switch as claimed in claim 6, wherein said channel waveguides have a first width at said respective end faces of said optical switch, and a second, narrower width between said respective end faces of said optical switch, such that the overall configuration is an X-shape with a central portion of said X-shape being removed.

8. An optical switch as claimed in claim 2, wherein said plurality of channel waveguides are formed in a Y-shape having a first end at one end face of said optical switch and two branches at the other end face of said optical switch, the light beam incident at said first end of said Y-shape being emitted from one or the other branch of said Y-shape in accordance with injection of current onto a portion of said second electrode contacting said gain-guided channel waveguide.

* * * * *